United States Patent [19]

Logsdon, Jr. et al.

[11] Patent Number: 4,693,501

[45] Date of Patent: Sep. 15, 1987

[54] REFRIGERATION TUBING JOINT

[75] Inventors: Terance B. Logsdon, Jr., Whitehouse; Donald L. Fisher, Tyler, both of Tex.

[73] Assignee: American Standard Inc., New York, N.Y.

[21] Appl. No.: 888,593

[22] Filed: Jul. 23, 1986

[51] Int. Cl.$^4$ .................... F16L 13/00; F16L 58/00
[52] U.S. Cl. .................... 285/173; 285/287; 285/381
[58] Field of Search ........... 285/173, 45, 172, 915, 285/381, 287, 286, 21, 923, 329; 165/133; 228/214, 175, 176; 29/447, 458

[56] References Cited

U.S. PATENT DOCUMENTS

| | | | |
|---|---|---|---|
| 2,741,498 | 4/1956 | Elliott | 285/329 |
| 2,745,797 | 5/1956 | Long | 285/173 |
| 2,823,933 | 2/1958 | Hickman et al. | 285/173 |
| 3,040,427 | 6/1962 | Howell | 29/474.3 |
| 3,042,428 | 7/1962 | Gardiner | 285/173 |
| 3,226,807 | 1/1966 | Orr | 285/381 |
| 3,289,293 | 12/1966 | Stenquist et al. | 228/214 |
| 3,297,819 | 1/1967 | Wetmore | 29/447 |
| 3,415,287 | 12/1968 | Heslop et al. | 285/915 |
| 3,534,986 | 10/1970 | Hartmann et al. | 228/214 |
| 3,589,873 | 6/1971 | Poth | 285/287 |
| 3,830,262 | 8/1974 | Lago | 285/173 |
| 3,937,387 | 2/1976 | Fletcher et al. | 228/214 |
| 4,044,797 | 8/1977 | Fujie et al. | 165/133 |
| 4,058,159 | 11/1977 | Iriarte | 165/133 |
| 4,415,187 | 11/1983 | Hudson, Jr. | 285/173 |
| 4,441,743 | 4/1984 | Steenbergen | 285/21 |
| 4,484,386 | 11/1984 | Stonitsch | 285/286 |

FOREIGN PATENT DOCUMENTS

| | | | |
|---|---|---|---|
| 571662 | 3/1959 | Canada | 285/329 |
| 38663 | 3/1977 | Japan | 165/133 |
| 202397 | 11/1984 | Japan | 165/133 |
| 651037 | 3/1951 | United Kingdom | 285/287 |

Primary Examiner—Cornelius J. Husar
Assistant Examiner—Anthony Knight
Attorney, Agent, or Firm—William J. Beres; Carl M. Lewis; Robert J. Harter

[57] ABSTRACT

A heat exchanger tube assembly having one end of a copper tube soldered to the end of an aluminum tube, and a method of minimizing galvanic corrosion at the soldered joint. The aluminum tube, having a roughened inner surface for enhanced heat transfer, fits inside the copper tube at the soldered joint. A heat shrinkable thermoplastic tube having a thermosetting adhesive inner coating is placed around the joint and then heated. The heat shrinks the thermoplastic tube, causing it to contract and to adhere tightly against and around the joint. The plastic tube with its adhesive inner coating protects the joint from atmospheric moisture and thus inhibits galvanic corrosion that would eventually create a leak in the tube joint.

6 Claims, 1 Drawing Figure

REFRIGERATION TUBING JOINT

TECHNICAL FIELD

This invention generally pertains to a heat exchanger tube joint comprising two tubes of dissimilar metals and a method of minimizing their galvanic corrosion and specifically pertains to a tube joint and method of protecting it against moisture by heat shrinking a thermoplastic tube tightly around the outer surface of the joint.

BACKGROUND OF THE INVENTION

Refrigeration systems often include heat exchangers comprising aluminum tubing that is soldered to copper tubing used to convey a refrigerant fluid to and from the heat exchanger. The two dissimilar metals produce a galvanic couple at their union, and in the presence of moisture or other electrolyte, galvanic corrosion occurs at the copper/aluminum interface. Aluminum, being more anodic than copper, deteriorates much more rapidly at the junction of the two metals, eventually causing a leak through which refrigerant may escape to the atmosphere.

This problem has been less serious in the past because the end of the copper tube could be inserted inside the end of the aluminum heat exchanger tube to form a solderable lap joint. In such a joint the aluminum that overlapped the copper first started corroding at the end of the alumnium tube. A leakage failure at the joint did not occur until the corrosion progressed to the other end of the overlap portion of the joint. With sufficient overlap, joint failure did not occur within the expected life of the refrigeration unit. Moreover, solder built up at the end of the aluminum tube could further delay joint failure.

Recently, however, it has been found desirable to use aluminum tubing having an internally roughened surface in constructing the heat exchanger to improve its heat transfer and thus improve the efficiency of the refrigeration system. This roughened surface includes a variety of forms such as helical or fluted fins which introduce turbulence to the refrigerant flowing through the heat exchanger tubing. But the roughened surface does not provide a mating surface for joining to another tube because the grooves on that surface form capillary channels that draw the solder or braze material away from the joint. Therefore, instead of the roughened inner surface, the smooth outer surface of such internally enhanced tubes are often used as the mating surface and are soldered to the inner surface of the adjoining copper tube. Unfortunately, however, the galvanic corrosion starts at the copper/aluminum interface where the exterior of the joint is exposed to moisture. Since this interface is at the end of the copper tube, the corrosion only needs to penetrate the thickness of the aluminum tube to cause a leakage failure at the joint. Unless this corrosion is inhibited, failure can occur well within the expected life of the refrigeration unit.

Therefore it is an object of this invention to inhibit galvanic corrosion at a joint of two tubes of dissimilar metals by protecting the joint from atmospheric moisture.

Another object is to cover the joint with a protective tubing that only requires the application of heat to shrink it tightly around the joint.

Still another object is to use a protective tubing that includes a thermosetting adhesive that not only seals out moisture but also seals any small refrigerant leaks at the joint.

These and other objects of the invention will be apparent from the attached drawing and the description of the preferred embodiments which follow hereinbelow.

SUMMARY OF THE INVENTION

The subject invention includes two metallic tubes of dissimilar metals joined to each other at one of their ends to form a joint. The outer surface of the joint is covered by a polymeric tube that shrinks when heated to contract tightly around the joint. The heat shrinkable polymeric tube has an adhesive inner coating that protects the joint from moisture and thus inhibits galvanic corrosion at the joint.

DESCRIPTION OF THE PREFERRED EMBODIMENTS

Figure 1:
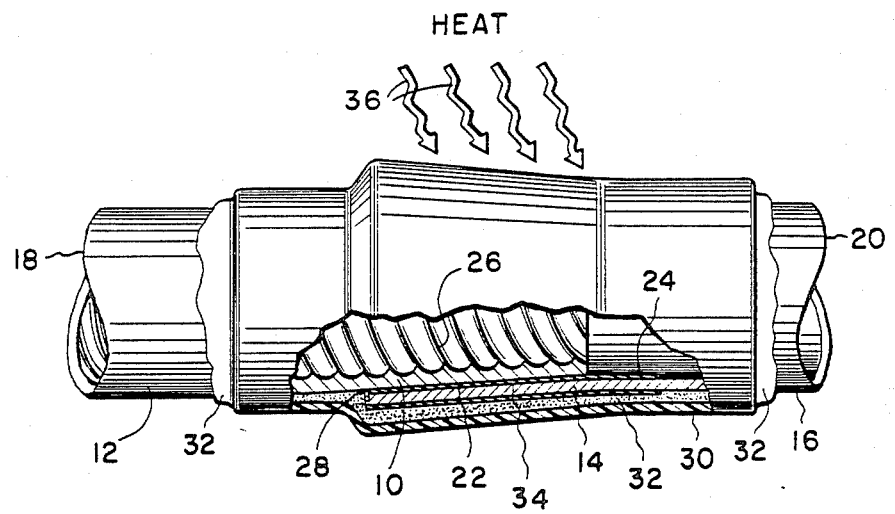
FIG. 1 shows a cutaway view of the subject invention.

Referring to FIG. 1, the cutaway view of the subject invention shows one end 10 of an aluminum tube 12 inserted into one end 14 of a copper tube 16. The other end 18 of aluminum tube 12 connects to an aluminum heat exchanger (not shown) and the other end 20 of copper tube 16 connects to a refrigerant circuit (not shown). Adjoining ends 10 and 14 are connected in a lap joint 22 by any suitable bonding process such as soldering, brazing, or gluing. In the preferred embodiment, solder 24 is used to bond the tubes together.

Tube ends 10 and 14 are slightly tapered in opposite directions at approximately seven degrees to their longitudinal axis, i.e. end 10 converges slightly and end 14 flares out slightly. The tapered ends 10 and 14 mate in a close fitting joint that requires a minimal amount of solder 24. In addition, helical grooves 26 are formed on the internal surface of aluminum tube 12 to provide a roughened surface for enhanced heat transfer. Since grooves 26 tend to carry the solder, braze material or glue away from the joint, they offer a poor mating surface for joining to another tube. Copper tube 16 is thus instead mated to the smooth external surface of aluminum tube 12.

The internal surface of end 14 of copper tube 16 is plated with a zinc-aluminum solder 24 and is slid over end 10 of aluminum tube 12 to form lap joint 22. While holding joint 22 together with a slight axial force, joint 22 is heated to melt solder 24. The slight axial force causes a wiping action as solder 24 melts, and tube end 10 seats inside end 14, thereby producing a strong bond.

A heat shrinkable polymeric tube 30 having an inner coating of a thermosetting adhesive 32 is used to prevent galvanic corrosion at the outer suface of the copper/aluminum interface 28. Heat shrinkable tube 30 contracts when heated and generally maintains its constricted shape after cooling. In the preferred embodiment, a heat shrinkable tube 30 such as "KYNAR" (trademark of Pennwalt Corporation) is slid over joint 22. Heat 36 (from an electric resistance heating element or flame—not shown) is applied to tube 30 to increase its temperature sufficiently so that adhesive 32 softens and so that tube 30 contracts tightly around joint 22, forcing any excess adhesive 32 to ooze out the ends of tube 30. With "KYNAR" tubing, the temperature of tube 30 is generally raised to approximately 300° to 400° F. to achieve this result. As tube 30 cools, adhesive 32 sets to not only provide a moisture-proof seal around joint 22 but also to seal any small refrigerant leaks that may occur at the solder joint. With the exterior of joint 22 sealed against moisture and the interior of joint 22 exposed only to refrigerant, substantially no electrolyte is present at the galvanic couple 34 (copper/aluminum interface) and thus galvanic corrosion is kept to a minimum or virtually eliminated.

Although adhesive 32 adds to the integrity of the moisture-proof seal, it is also possible to seal joint 22 without adhesive 32, provided the polymeric tube 30 contracts sufficiently tightly around joint 22 to exclude moisture.

In another embodiment, an elastic tube (not shown) sized to have a diameter substantially less than the diameter of tubes 18 or 20 (when not elastically expanded) can be used instead of heat shrinkable tube 30. With such an alternative, the elastic tube is stretched over joint 22 and is allowed to resiliently contract in a radial direction tightly around it. As with heat shrinkable tube 30, an appropriate adhesive can also be used at joint 22 to bond the elastic tube to the metal tubes, thereby obtaining a more positive seal against atmospheric moisture.

Although the invention is described with respect to two preferred embodiments, modifications thereto will become apparent to those skilled in the art. Therefore, the scope of the invention is to be determined by reference to the claims which follow.

We claim:

1. A tube assembly comprising a first tube made mostly of copper that is bonded to an outer surface of a second tube made mostly of aluminum to form a joint said second tube having a roughened inner surface and said joint having an outer surface that is covered by a heat shrinkable tube having a thermosetting adhesive inner coating whose adherence to said joint is initiated by heating said shrinkable tube, said shrinkable tube being impermeable to moisture and thus inhibiting galvanic corrosion around said joint.

2. The tube assembly as recited in claim 1, wherein said joint is bonded by soldering.

3. The tube assembly as recited in claim 1, wherein said joint is bonded by brazing.

4. A method of joining two tubes of dissimilar metals comprising the steps of bonding a first tube made mostly of copper to an outer surface of a second tube made mostly of aluminum to form a joint, said second tube having a roughened inner surface for enhancing heat transfer, surrounding said joint with a heat shrinkable tube having a thermosetting adhesive inner coating, and heating said heat shrinkable tube to simultaneously initiate the adherence of said adhesive to said joint and to cause said shrinkable tube to contract around said joint, thereby providing protection against galvanic corrosion by sealing out moisture.

5. The method of joining two tubes of dissimilar metals as recited in claim 4, wherein said steps of bonding is preformed by soldering.

6. The method of joining two tubes of dissimilar metals as recited in claim 4, wherein said step of bonding is preformed by brazing.

* * * * *